(12) United States Patent
Rossi

(10) Patent No.: US 8,510,507 B2
(45) Date of Patent: Aug. 13, 2013

(54) DATA STORAGE MIRRORING USING VIRTUAL MIRROR

(75) Inventor: Robert P. Rossi, Altamonte Springs, FL (US)

(73) Assignee: Xyratex Technology Limited, Havant (GB)

(*) Notice: Subject to any disclaimer, the term of this patent is extended or adjusted under 35 U.S.C. 154(b) by 613 days.

(21) Appl. No.: 12/691,321

(22) Filed: Jan. 21, 2010

(65) Prior Publication Data

US 2011/0179224 A1  Jul. 21, 2011

(51) Int. Cl.
*G06F 12/00* (2006.01)
*G06F 12/10* (2006.01)
*G06F 12/16* (2006.01)

(52) U.S. Cl.
USPC .... 711/114; 711/162; 711/207; 711/E12.001; 711/E12.061

(58) Field of Classification Search
None
See application file for complete search history.

(56) References Cited

U.S. PATENT DOCUMENTS

| | | | |
|---|---|---|---|
| 5,664,187 A * | 9/1997 | Burkes et al. | 711/114 |
| 6,487,636 B1 * | 11/2002 | Dolphin et al. | 711/114 |
| 6,510,500 B2 * | 1/2003 | Sarkar | 711/162 |
| 6,795,895 B2 * | 9/2004 | Merkey et al. | 711/114 |
| 6,839,819 B2 * | 1/2005 | Martin | 711/162 |
| 6,862,609 B2 * | 3/2005 | Merkey | 709/214 |
| 6,898,688 B2 * | 5/2005 | Martin et al. | 711/202 |
| 7,007,043 B2 * | 2/2006 | Farmer et al. | 707/654 |
| 7,007,044 B1 * | 2/2006 | Rafert et al. | 707/655 |
| 7,036,043 B2 * | 4/2006 | Martin et al. | 714/19 |
| 7,340,645 B1 * | 3/2008 | Martin et al. | 714/15 |
| 7,356,644 B2 * | 4/2008 | Bruning et al. | 711/114 |
| 7,464,239 B2 * | 12/2008 | Hwang et al. | 711/162 |
| 7,657,717 B1 * | 2/2010 | Karr et al. | 711/162 |
| 7,865,475 B1 * | 1/2011 | Yadav et al. | 707/655 |
| 7,904,678 B1 * | 3/2011 | Karr et al. | 711/162 |
| 2002/0129214 A1 * | 9/2002 | Sarkar | 711/162 |
| 2003/0041211 A1 * | 2/2003 | Merkey et al. | 711/114 |
| 2003/0070043 A1 * | 4/2003 | Merkey | 711/114 |
| 2003/0131253 A1 * | 7/2003 | Martin et al. | 713/200 |
| 2003/0135703 A1 * | 7/2003 | Martin et al. | 711/162 |
| 2003/0135704 A1 * | 7/2003 | Martin | 711/162 |
| 2003/0135783 A1 * | 7/2003 | Martin et al. | 714/13 |
| 2004/0133575 A1 * | 7/2004 | Farmer et al. | 707/9 |
| 2006/0101205 A1 * | 5/2006 | Bruning et al. | 711/114 |
| 2007/0239952 A1 * | 10/2007 | Hwang et al. | 711/162 |

OTHER PUBLICATIONS

Patterson, et al., "A Case for Redundant Arrays of Inexpensive Disks (RAID)", Association for Computing Machinery (ACM), 1988, pp. 109-116.

* cited by examiner

*Primary Examiner* — Kevin Verbrugge
(74) *Attorney, Agent, or Firm* — Pillsbury Winthrop Shaw Pittman LLP

(57) ABSTRACT

There is provided a method and apparatus for implementing a virtual mirror of a primary storage device (106) on a secondary storage device (108). The method comprises providing a map (124a) for translating primary data storage locations on said primary storage device (106) to secondary data storage locations on said secondary storage device (106) and utilizing said map (124a) to enable data stored on said secondary storage device (108) to mirror data stored on said primary storage device (106). By providing such a method, the requirements of the primary and secondary disks (106, 108) can be decoupled such that a smaller secondary disk (108) could be used with a larger primary (106) which will not be filled to capacity. This reduces the unused capacity on the secondary disk (108) which would otherwise be wasted. Further, this approach allows for the replacement of the primary and secondary disks (106, 108) to be independent of each other, provided the size of the secondary disk (108) remains at least as large as the size of the data on the primary disk (106).

49 Claims, 7 Drawing Sheets

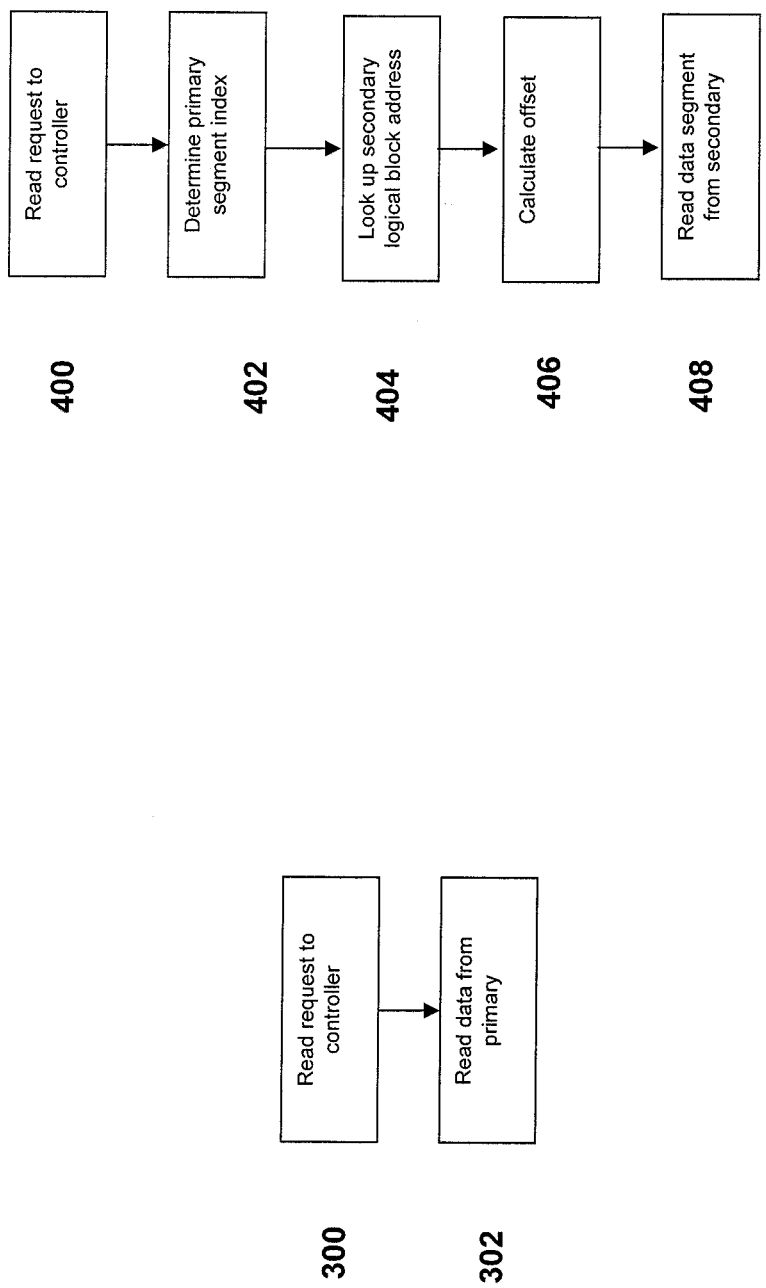

DATA STORAGE MIRRORING USING VIRTUAL MIRROR

The present invention relates to a method of, and apparatus for, providing a virtual mirror of a primary storage device on a secondary storage device.

Commonly, redundant arrays of inexpensive disk (RAID) arrays are the primary storage architecture for large, networked computer storage systems. The RAID architecture was first disclosed in "A Case for Redundant Arrays of Inexpensive Disks (RAID)", Patterson, Gibson, and Katz (University of California, Berkeley). RAID architecture combines multiple small, inexpensive disk drives into an array of disk drives that yields performance exceeding that of a single large drive.

There are a number of different RAID architectures, designated as RAID-1 through RAID-6. Each architecture offers disk fault-tolerance and offers different trade-offs in terms of features and performance. In addition to the different architectures, a non-redundant array of disk drives is referred to as a RAID-0 array. RAID controllers provide data integrity through redundant data mechanisms, high speed through streamlined algorithms, and accessibility to stored data for users and administrators.

RAID architecture provides data redundancy in two basic forms: mirroring (RAID 1) and parity (RAID 3, 4, 5 and 6). The implementation of mirroring in RAID 1 architectures involves creating an identical image of the data on a primary disk on a secondary disk. The contents of the primary and secondary disks in the array are identical. RAID 1 architecture requires at least two drives and has increased reliability when compared to a single disk. Since each disk contains a complete copy of the data, and can be independently addressed, reliability is increased by a factor equal to the power of the number of independent mirrored disks, i.e. in a two disk arrangement, reliability is increased by a factor of four. Normally data is mirrored onto physically identical drives, though the process can be applied to logical drives where the underlying physical format is hidden from the mirroring process.

Mirroring enables a system to automatically maintain one or more copies of data so that, in the event of a disk hardware failure, a system can quickly recover lost data. Mirroring may be performed locally and/or remotely as part of a disaster recovery process.

Usually, mirroring is achieved using hardware approaches such as disk arrays or is written in software within the operating system. As data is written to a primary disk, a copy is written automatically to one or more secondary disks. Data can be read from either disk, and a high performance system would recognize which disk was in a better physical state to retrieve the data most quickly. In the event of a disk failure, it is typical for the faulty disk to be replaced and the data backed up from the remaining operational disk to the new disk.

RAID 3, 4, 5, or 6 architectures generally utilise three or more disks of identical capacity. In these architectures, two or more of the disks are utilised for reading/writing of data and one of the disks stores parity data. Data interleaving across the disks is usually in the form of data "striping" in which the data to be stored is broken down into blocks called "stripe units". The "stripe units" are then distributed across the disks. Therefore, should one of the disks in a RAID group fail or become corrupted, the missing data can be recreated from the data on the other disks. The data may be reconstructed through the use of the redundant "stripe units" stored on the remaining disks. However, RAID architectures utilising parity configurations need to generate and write parity data during a write operation. This may reduce the performance of the system.

Minor architectures such as RAID 1 generally show improved performance when compared to parity-based architectures because there is no need to generate parity data. However, a disadvantage of mirror architectures such as RAID 1 is that an additional, identical disk is required for each minor. Modern mirroring solutions generally require two or more physical storage destinations with the secondary target drive(s) having capacities at least equal to the primary drive. In some solutions, the secondary drive has to be identical to the primary in order for the system to operate.

In a typical storage resource, drives or volumes are generally configured with unused free storage space in order to accommodate future growth and to facilitate adequate file system operation. The amount of free space varies from system to system but, typically, ranges from 25% to 100% of the size of the data set. This generally translates into the primary drive having approximately 20-50% free capacity. Indeed, many file systems and protocols require a minimum of 15-20% free capacity in order to operate effectively, for example by requiring space for use as virtual memory.

Therefore, since many mirroring solutions require the secondary drive or drives to have a capacity which is equal to or greater than the primary drive, then the unused storage space on the primary drive results in at least the same amount of unused storage space on the secondary drive or drives. Any free capacity on the primary drive will be effectively multiplied by the total number of primary and secondary drives in the RAID 1 array.

Also, if the primary drive needs to be replaced (for example, to be upgraded in size) then the or each secondary drive must also be replaced to correspond to the primary. One reason for this is that many file systems store data across the whole of a hard disk, irrespective of the currently used capacity of the disk. In that scenario, providing a secondary disk which is smaller and/or of different configuration to the primary disk will lead to errors because the file system will attempt to copy data to a region of the secondary disk which may not exist.

Therefore, known storage provision arrangements suffer from a technical problem that the secondary disk or disks are effectively coupled to the primary disk in terms of size and configuration. This multiplies the unused capacity of a primary disk and increases maintenance cost, resource requirements, power consumption and the risk of drive failure.

According to a first aspect of the present invention, there is provided a method of providing a virtual mirror of a primary storage device on a secondary storage device, the method comprising: providing a map for translating primary data storage locations on said primary storage device to secondary data storage locations on said secondary storage device; and utilising said map to enable data stored on said secondary storage device to mirror data stored on said primary storage device.

By providing such a method, the requirements of the primary and secondary disks can be decoupled such that a smaller secondary disk could be used with a larger primary which will not be filled to capacity. This reduces the unused capacity on the secondary disk which would otherwise be wasted. Further, this approach allows for the replacement of the primary and secondary disks to be independent of each other, provided the size of the secondary disk remains at least as large as the size of the data on the primary disk.

In a variation, the method further comprises: defining a plurality of primary storage segments on the primary storage device, each primary storage segment having a primary index; defining a plurality of secondary storage segments on the secondary storage device, each secondary storage segment having a secondary index; wherein the step of providing said map comprises storing, for at least one primary index of a primary storage segment, a corresponding secondary index of a secondary storage segment such that the or each secondary storage segment is mapped to a respective primary storage segment.

This approach provides a convenient way of denoting the data storage locations on the primary and the secondary storage devices, and by storing the segment indices in the map, enables the secondary storage device to function as a mirror (i.e. an exact or identical copy) of the primary even though the data structure on the secondary storage device may be different from that on the primary storage device.

In one example, the method further comprises: writing data to at least one primary storage segment; determining the primary segment index of the or each primary storage segment; selecting one or more available secondary storage segments; storing the secondary index of the or each selected secondary storage segment against the primary segment index of said the or each primary storage segment; and writing a copy of said data to the or each corresponding secondary storage segment associated with the or each primary storage segment.

This approach enables a write to occur to the secondary storage device without the need to mirror the exact logical block address to which the data on the primary storage device has been written to. This enables the data to be packaged differently in a more space-efficient and convenient fashion, also enabling, for example, defragmentation operations to be carried out on the secondary storage device alone.

According to a second aspect of the present invention, there is provided a method of providing a virtual mirror of a primary storage device on a secondary storage device, the method comprising: defining a plurality of primary storage segments on the primary storage device, each primary storage segment having a primary index; writing data to at least one primary storage segment of the primary storage device; determining the primary segment index of the or each primary storage segment; selecting one or more available secondary storage segments on the secondary storage device; storing the secondary index of the or each selected secondary storage segment against the primary segment index of the or each primary storage segment to which the data has been written to; and writing a copy of said data to the or each selected secondary storage segments.

This approach enables a write to occur to the secondary storage device without the need to mirror the exact logical block address to which the data on the primary storage device has been written to. This enables the data to be packaged differently in a more space-efficient and convenient fashion, also enabling, for example, defragmentation operations to be carried out on the secondary storage device alone.

In one approach, the step of selecting further comprises selecting an available secondary storage segment from said secondary storage segments. The free secondary storage segment may be selected by any suitable search criteria; for example, sequential.

In one example, the step of selecting further comprises selecting the first available secondary storage segment from the start of the sequence of said secondary storage segments. This provides a compact and space-efficient method of storing data on the secondary storage device. In a variation, the step of selecting further comprises identifying the first available secondary storage segment from a bitmap file or memory location.

In another example, the method further comprises, for the data to be written, calculating the byte offset from the start of the or each said secondary storage segment.

In a variation, the method further comprises reading data from a virtual mirror of said primary storage device on said secondary storage device, said step of reading data comprising: determining the primary index of the primary storage segment corresponding to said data; determining the secondary index of said of the secondary storage segment stored against said primary index; and reading said data from the secondary storage segment having said secondary index.

This approach enables data to be read from the secondary storage device in situations when, for example, faster data access can provided by requesting from this device as opposed to the primary storage device. This affords greater flexibility.

According to a third aspect of the present invention, there is provided a method of reading data from a virtual mirror of a primary storage device on a secondary storage device, the primary storage device having a plurality of primary storage segments defined thereon, each primary storage segment having a primary index, the secondary storage device having a plurality of secondary storage segments defined thereon, each secondary storage segment having a secondary segment index, the method comprising: determining the primary index of the primary storage segment corresponding to said data; determining, the secondary index stored against said primary index; and reading said data from the secondary storage segment having said secondary index.

This approach enables data to be read from the secondary storage device in situations when, for example, faster data access can provided by requesting from this device as opposed to the primary storage device. This affords greater flexibility.

In one variation, the method further comprises, for the data to be read, calculating the byte offset from the start of the or each said secondary storage segment.

In one example, said primary storage segments are the same size. In another example, said secondary storage segments are the same size. This is beneficial for the operation of the file system.

In a further example, said primary storage segments and said secondary storage segments are the same size. This approach enables accurate translation between the primary and secondary storage segments.

In a variation, said primary storage segments have a size equal to or greater than the size of a logical block on said primary storage device.

In one example, said secondary storage segments have a size equal to or greater than the size of a logical block on said secondary storage device.

In one arrangement, the map comprises a look up table. This is a convenient method for storing data regarding the translation between primary and secondary storage locations, which may include the primary and secondary indices.

In a variation, said primary and secondary storage devices are controlled by a controller, and said look up table is stored in a memory of said controller and/or in a non-volatile memory. By providing off-host management on the controller, efficient management of the storage resource is possible. Alternatively or additionally, the look up table may be stored in a non-volatile memory. This memory may be located on-host or off-host. The memory must be non-volatile in the sense that the look up table is required to be stored even when the controller or system is shut down. Therefore, non-volatile or semi-permanent storage media are preferred for this memory. The memory may comprise, for example, storage space on the primary or secondary storage devices, or storage space on an alternative hard disk drive or solid-state memory storage.

In an alternative variation, said primary and secondary storage devices are connected to a host computer, and said look up table is stored on said host computer. By providing on-host management of the primary and secondary storage devices, the need for a specialised controller is removed.

In an example, the primary and secondary storage devices are of different storage capacity and/or configuration. This approach enables the size and/or configuration requirements of the primary and secondary storage devices to be decoupled, i.e. the secondary device may be much smaller than the primary device (provided the secondary has sufficient space for the data stored on the primary). Alternatively, if primary and secondary devices are the same sizes, then if the primary device is upgraded to a larger size, the secondary device may not need upgrading.

According to a fourth aspect of the present invention, there is provided a controller for providing a virtual minor of a primary storage device on a secondary storage device, the controller being operable to: provide a map for translating primary data storage locations on said primary storage device to secondary data storage locations on said secondary storage device; and utilise said map to enable data stored on said secondary storage device to minor data stored on said primary storage device.

By providing such an arrangement, the primary and secondary disks can be decoupled such that, for example, a smaller secondary disk could be used with a larger primary which will not be filled to capacity. This reduces the unused capacity on the secondary disk which would otherwise be wasted. Further, should the primary disk be replaced with, for example, a larger capacity disk, if the capacity of the secondary disk is at least equal to the utilised portion of the new primary disk, then the secondary disk need not be replaced.

In an example, the controller is further operable to: define a plurality of primary storage segments on a primary storage device, each primary storage segment having a primary index; define a plurality of secondary storage segments on a secondary storage device, each secondary storage segment having a secondary index, wherein the controller is further operable to: provide said map by storing, for at least one primary index of a primary storage segment, a corresponding secondary index of a secondary storage segment in order to map the or each secondary storage segment to a respective primary storage segment.

This arrangement provides a convenient way of denoting the data storage locations on the primary and the secondary storage devices, and by storing the segment indices in the map, enables the secondary storage device to function as a mirror (i.e. an exact or identical copy) of the primary even though the data structure on the secondary storage device may be different from that on the primary storage device.

In one arrangement, the controller is further operable to: write data to at least one primary storage segment, to determine the primary segment index of the or each primary storage segment, to select one or more available secondary storage segments, to store the secondary index of the or each selected secondary storage segment against the primary segment index of said the or each primary storage segment; and to write a copy of said data to the or each corresponding secondary storage segment associated with the or each primary storage segment.

This arrangement enables a write to occur to the secondary storage device without the need to mirror the exact logical block address to which the data on the primary storage device has been written to. This enables the data to be packaged differently in a more space-efficient and convenient fashion, also enabling, for example, defragmentation operations to be carried out on the secondary storage device alone.

According to a fifth aspect of the present invention, there is provided a controller for providing a virtual mirror of a primary storage device on a secondary storage device, the controller being operable to: define a plurality of primary storage segments on a primary storage device, each primary storage segment having a primary index, to write data to at least one primary storage segment of the primary storage device, to determine the primary segment index of the or each primary storage segment, to select one or more available secondary storage segments on the secondary storage device, to store the secondary index of the or each selected secondary storage segment against the primary segment index of the or each primary storage segment to which the data has been written to; and to write a copy of said data to the or each selected secondary storage segments.

This arrangement enables a write to occur to the secondary storage device without the need to mirror the exact logical block address to which the data on the primary storage device has been written to. This enables the data to be packaged differently in a more space-efficient and convenient fashion, also enabling, for example, defragmentation operations to be carried out on the secondary storage device alone.

In an example, the controller is further operable to select an available secondary storage segment from said secondary storage segments. The free secondary storage segment may be selected by any suitable search criteria; for example, sequential.

In one arrangement, the controller is further operable to select the first available secondary storage segment from the start of the sequence of said secondary storage segments. This provides a compact and space-efficient method of storing data on the secondary storage device. In a variation, the controller is further operable to identify the first available secondary storage segment from a bitmap file or memory location.

In another arrangement, the controller is further operable, for the data to be written, to calculate the byte offset from the start of the or each said secondary storage segment.

In a variation, the controller is further operable to read data from a virtual mirror of said primary storage device on said secondary storage device, the controller being operable to: determine the primary index of the primary storage segment corresponding to said data, to determine the secondary index of said of the secondary storage segment stored against said primary index; and to read said data from the secondary storage segment having said secondary index.

According to a sixth aspect of the present invention, there is provided a controller for reading data from a virtual mirror of a primary storage device on a secondary storage device, the primary storage device having a plurality of primary storage segments defined thereon, each primary storage segment having a primary index, the secondary storage device having a plurality of secondary storage segments defined thereon, each secondary storage segment having a secondary segment index, the controller being operable to: determine the primary index of the primary storage segment corresponding to said data, to determine the secondary index stored against said primary index; and to read said data from the secondary storage segment having said secondary index.

In one arrangement, the controller is further operable, for the data to be read, to calculate the byte offset from the start of the or each said secondary storage segment.

In one example, said primary storage segments are the same size. In another example, said secondary storage segments are the same size. In a further example, said primary storage segments and said secondary storage segments are the same size.

In a variation, said primary storage segments have a size equal to or greater than the size of a logical block on said primary storage device. In a further variation, said primary storage segments have a size which is an integer multiple of the size of a logical block on said primary storage device.

In one example, said secondary storage segments have a size equal to or greater than the size of a logical block on said secondary storage device. In a further example, secondary storage segments have a size which is an integer multiple of the size of a logical block on said secondary storage device.

In one variation, the map comprises a look up table. This is a convenient method for storing data regarding the translation between primary and secondary storage locations, which may include the primary and secondary indices.

In one arrangement, the controller further comprises a memory and said look up table is stored in the memory.

In an alternative arrangement, the controller is connected to a host computer, and said look up table is stored on said host computer.

In one example, the controller is a RAID controller. In a further example, the RAID controller is implemented in hardware or software. For example, the RAID controller could be implemented in on-host software, in software off-host, or in hardware such as RAID controller firmware.

In an example, the primary and secondary storage devices are of different storage capacity and/or configuration.

This arrangement enables the size and/or configuration requirements of the primary and secondary storage devices to be decoupled, i.e. the secondary device may be much smaller than the primary device (provided the secondary has sufficient space for the data stored on the primary). Alternatively, if primary and secondary devices are the same sizes, then if the primary device is upgraded to a larger size, the secondary device may not need upgrading.

According to a seventh aspect of the present invention, there is provided data storage apparatus comprising a primary storage device, a secondary storage device and a controller according to the fourth, fifth or sixth aspects.

According to an eighth aspect of the present invention, there is provided a computer program product executable by a programmable processing apparatus, comprising one or more software portions for performing the steps of the first to third aspects.

According to a ninth aspect of the present invention, there is provided a computer usable storage medium having a computer program product according to the eighth aspect stored thereon.

Embodiments of the present invention will now be described in detail with reference to the accompanying drawings, in which:

FIG. 6 is a flow diagram illustrating the process of reading data from a primary storage device;

FIG. 7 is a flow diagram illustrating the process of reading data from a secondary storage device.

Figure 1:
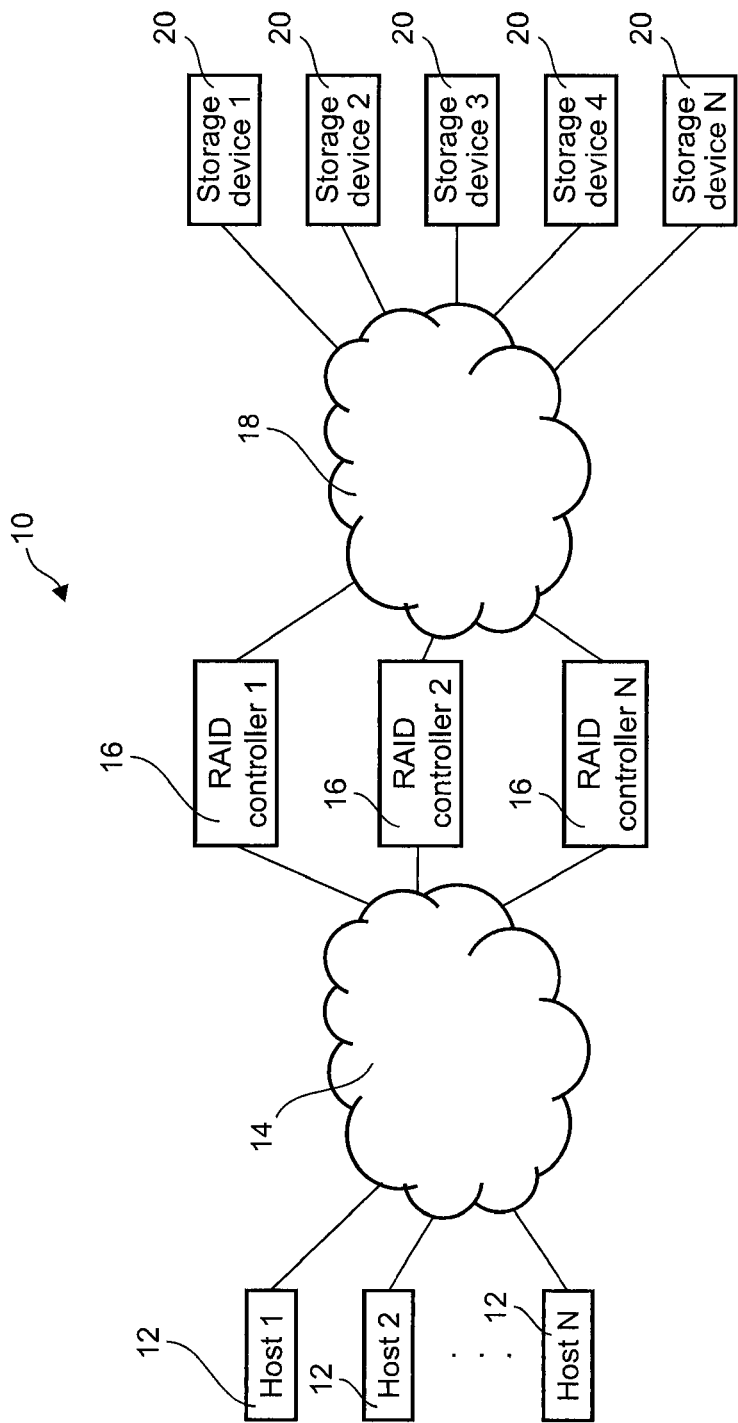
FIG. 1 is a schematic diagram of a networked storage resource.

FIG. 1 shows a schematic illustration of a networked storage resource 10 in which the present invention may be used. The networked storage resource 10 comprises a plurality of hosts 12. The hosts 12 are representative of any computer systems or terminals that are operable to communicate over a network. Any number of hosts 12 may be provided; N hosts 12 are shown in FIG. 1, where N is an integer value.

The hosts 12 are connected to a first communication network 14 which couples the hosts 12 to a plurality of RAID controllers 16. The communication network 14 may take any suitable form, and may comprise any form of electronic network that uses a communication protocol; for example, a local network such as a LAN or Ethernet, or any other suitable network such as a mobile network or the internet.

The RAID controllers 16 are connected through device ports (not shown) to a second communication network 18, which is also connected to a plurality of storage devices 20. The RAID controllers 16 may comprise any storage controller devices that process commands from the hosts 12 and, based on those commands, control the storage devices 20. RAID architecture combines a multiplicity of small, inexpensive disk drives into an array of disk drives that yields performance that can exceed that of a single large drive. This arrangement enables high speed access because different parts of a file can be read from different devices simultaneously, improving access speed and bandwidth. Additionally, each storage device 120 comprising a RAID array of devices appears to the hosts 12 as a single logical storage unit (LSU) or drive.

The operation of the RAID controllers 16 may be set at the Application Programming Interface (API) level. Typically, Original Equipment Manufactures (OEMs) provide RAID networks to end users for network storage. OEMs generally customise a RAID network and tune the network performance through an API.

Any number of RAID controllers 16 may be provided, and N RAID controllers 16 (where N is an integer) are shown in FIG. 1. Any number of storage devices 18 may be provided; in FIG. 1, N storage devices 18 are shown, where N is any integer value.

The second communication network 18 may comprise any suitable type of storage controller network which is able to connect the RAID controllers 16 to the storage devices 20. The second communication network 18 may take the form of, for example, a SCSI network, an iSCSI network or fibre channel.

The storage devices 20 may take any suitable form; for example, tape drives, disk drives, non-volatile memory, or solid state devices. Although most RAID architectures use hard disk drives as the main storage devices, it will be clear to the person skilled in the art that the embodiments described herein apply to any type of suitable storage device. More than one drive may form a storage device 20; for example, a RAID array of drives may form a single storage device 20. The skilled person will be readily aware that the above features of the present embodiment could be implemented in a variety of suitable configurations and arrangements.

The RAID controllers 16 and storage devices 20 also provide data redundancy. The RAID controllers 16 provide data integrity through a built-in redundancy which includes data mirroring. The RAID controllers 16 are arranged such that, should one of the drives in a group forming a RAID array fail or become corrupted, the missing data can be recreated from the data on the other drives. The data may be reconstructed through the use of data mirroring. In the case of a disk rebuild operation, this data is written to a new replacement drive that is designated by the respective RAID controller 16.

Figure 2:
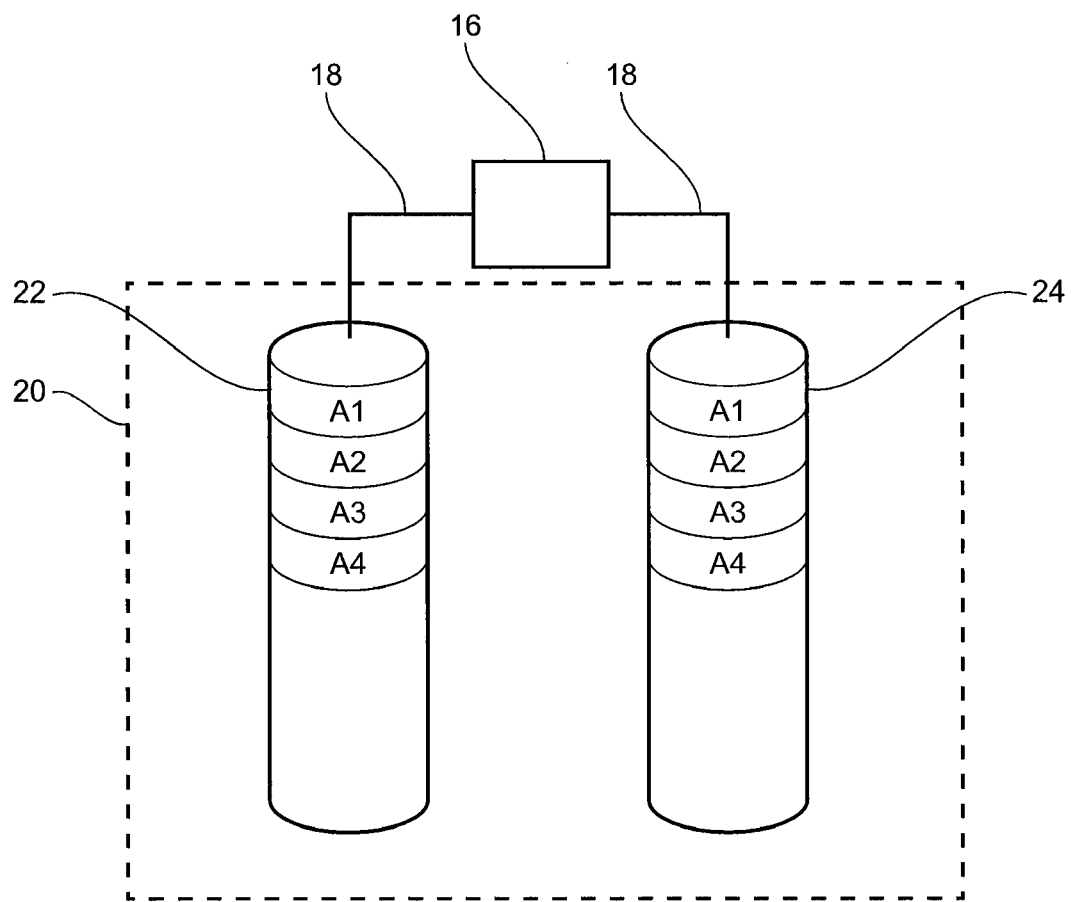
FIG. 2 is a schematic diagram of a conventional RAID 1 array comprising primary and secondary physical drives.

FIG. 2 shows a schematic diagram of a conventional RAID 1 arrangement. The storage device 20 comprises a primary physical drive 22 and a secondary physical drive 24. The physical drives 22, 24 in FIG. 2 take the form of hard disk drives. However, as set out above in relation to FIG. 1, any suitable type of drive may be used.

The physical drives 22, 24 are controlled by the RAID controller 16 which is connected to the physical drives 22, 24 through the second communication network 18. The second communication network 18 may take any suitable form; for example an iSCSI network. Under the control of the RAID controller 16, the physical drives 22, 24 form part of a conventional RAID 1 network.

In this arrangement, an exact copy (or mirror) of a set of data on the primary physical drive 22 is created on the secondary physical drive 24. Consequently, the data segments A1 to A5 on the primary physical drive 22 are mirrored exactly on the secondary physical drive 24. Such an array can only be as large as the smaller of the primary and secondary physical drives 22, 24. The secondary physical drive 24 contains a complete copy of the data on the primary physical drive 22 and since the secondary physical drive 24 can be addressed independently, reliability is raised by a power of two.

In an alternative arrangement, a RAID controller 16 may be provided for each physical drive 22, 24. This is known as duplexing. In this arrangement, when reading, the physical drives 22, 24 can be accessed independently and requested sectors can be split evenly between the physical drives 22, 24. In a further alternative, additional secondary physical drives 24 may be provided, each additional secondary physical drive 24 being identical to the primary physical drive 22 and identical to the secondary physical drive 24 shown in FIG. 2.

In the above cases, the primary physical drive 22 and secondary physical drive 24 are required to be identical. Consequently, any unutilised free space on the primary physical drive 22 is effectively multiplied by provision of one or more identical secondary physical drives 24. Further, should the primary physical drive 22 be required to be replaced (for example, with a larger capacity drive to increase the storage capacity of the network resource 10), then the or each secondary physical drive 24 must also be replaced.

Figure 3:
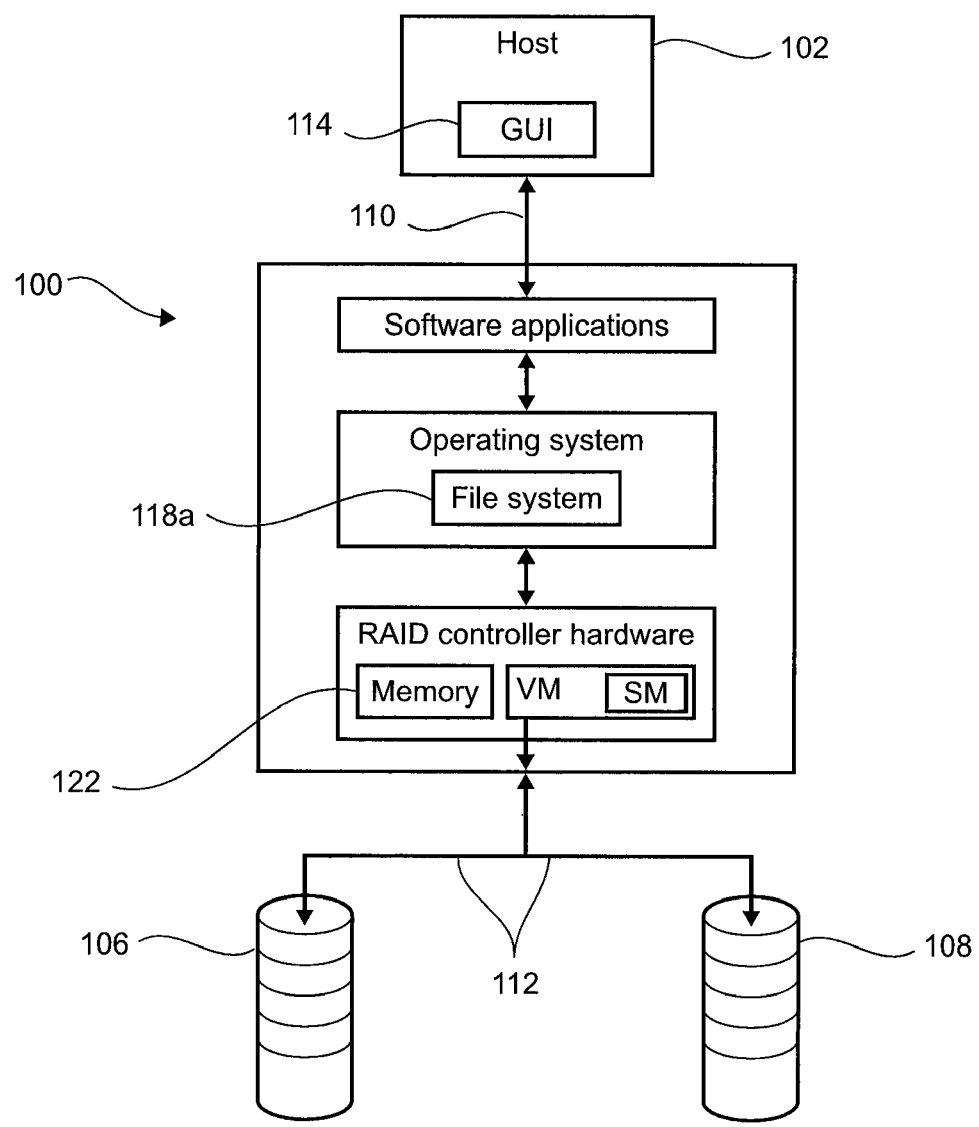
FIG. 3 is a schematic diagram showing a RAID controller of an embodiment of the present invention.

FIG. 3 shows a schematic diagram of an embodiment of the present invention. A storage resource 100 comprises a host 102, a RAID controller 104, a primary storage device 106 and a secondary storage device 108. The host 102 is connected to the RAID controller 104 through a communication network 110 such as an Ethernet and the RAID controller 104 is, in turn, connected to the primary storage device 106 and the secondary storage device 108 via a storage network 112 such as an iSCSI network.

The host 102 comprises a general purpose computer (PC) which is operated by a user and which has access to the storage resource 100. A graphical user interface (GUI) 114 is run on the host 102. The GUI 114 is a software application which acts as a user interface for a user of the host 102.

The RAID controller 104 comprises a software application layer 116, an operating system 118 and RAID controller hardware 120. The software application layer 116 comprises software applications including the algorithms and logic necessary for the initialisation and run-time operation of the RAID controller 104. The software application layer 116 includes software functional blocks such as a system manager for fault management, task scheduling and power management. The software application layer 116 also receives commands from the host 102 (e.g., assigning new volumes, read/write commands) and executes those commands. Commands that cannot be processed (because of lack of space available, for example) are returned as error messages to the user of the host 102.

The operating system 118 utilises an industry-standard software platform such as, for example, Linux, upon which the software applications forming part of the software application layer 116 can run. The operating system 118 comprises a file system 118*a* which enables the RAID controller 104 to store and transfer files and interprets the data stored on the primary and secondary drives into, for example, files and directories for use by the operating system 118. 124*a*

The RAID controller hardware 120 is the physical processor platform of the RAID controller 104 that executes the software applications in the software application layer 116. The RAID controller hardware 120 comprises a microprocessor, memory 122, and all other electronic devices necessary for RAID control of the primary and secondary storage devices 106, 108. The RAID controller 120 also comprises the firmware or software (virtual mirror 124*a*) for data mirroring operations on the primary and secondary storage devices 106, 108. The virtual mirror (VM) 124 is configured to translate the physical layout of the secondary device 108 such that the secondary device 108 appears to the file system 118*a* and operating system 118 as a mirror of the primary storage device 106. The virtual mirror 124 comprises a segment map (SM) 124*a*. This will be discussed later.

The primary storage device 106 comprises a hard disk drive generally of high capacity, for example, 1 TB. The primary storage device 106 can be accessed by the host 102 through the RAID controller 104 to read/write data. The secondary storage device 108 also comprises a hard disk drive generally of high capacity, for example, 500 GB to 1 TB. However, as will be described, the secondary storage device 108 need not be identical to the primary storage device 106 and may be smaller in capacity. The secondary storage device 108 can be accessed by the host 102 through the RAID controller 104 to read/write data independently of the primary storage device 106.

In use, the secondary storage device 108 will generally contain a duplicate of the data stored on the primary storage device 106. However, whilst the data stored on the secondary storage device 108 is the same as the data stored on the primary storage device 106, the embodiment of the present invention enables the packaging of the data to be different. This enables the requirements of the primary and secondary storage devices 106, 108 to be effectively decoupled, in contrast to the arrangement shown in and described with reference to FIG. 2.

Figure 4:
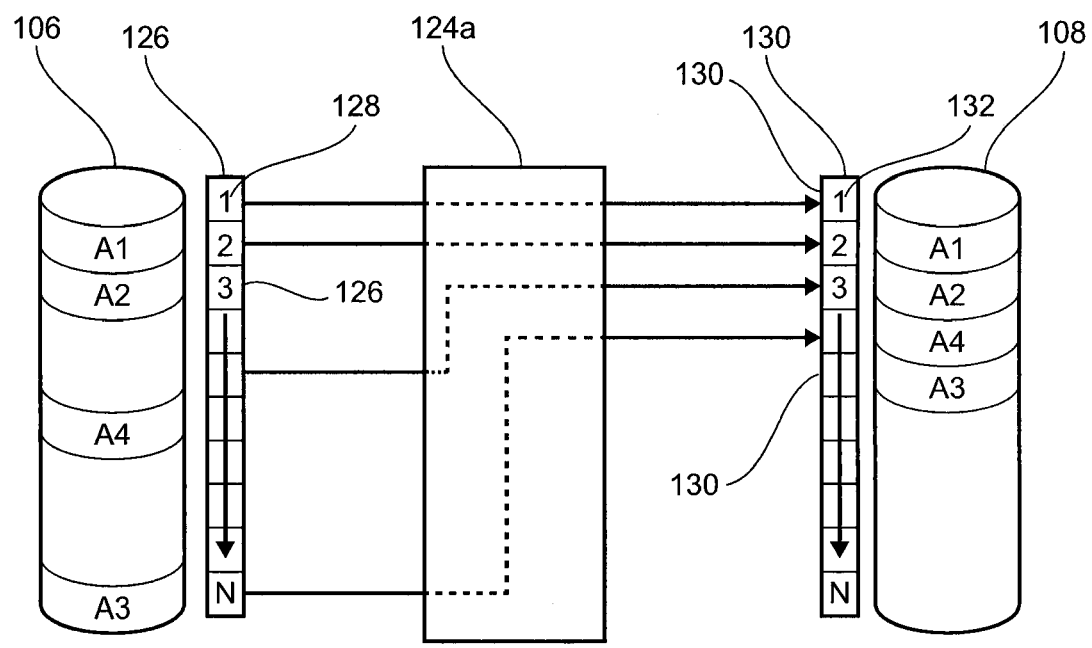
FIG. 4 is a schematic diagram of the mapping between storage sector indices in an embodiment of the present invention.

FIG. 4 shows a schematic diagram of the principle of operation of the embodiment of FIG. 3. The virtual mirror 124 is configured to analyse the primary storage device 106, and to define on the primary storage device 106 a plurality of (preferably equal-sized) primary storage segments 126, each of which is assigned an index 128. The index 128 may be any number from 0 (or 1) to N, where N is an integer. Each primary storage segment 126 may be of any suitable size, although preferably each primary storage segment 126 is equal to or greater than the size of a logical block, i.e. equal to or greater than 512 or 1024 bytes. Typically, each primary storage segment 126 will be a multiple of the size of a logical block, for example in the range of 4K to 64K. The primary storage segment 126 may have an even larger size if required.

The optimal choice is dependent upon the file system, the database and/or the type of accesses involved.

As a result of the analysis of the primary storage device 106, the segment map (SM) 124a is created and is stored in the RAID controller 104.

The virtual mirror 124 is also configured to analyse the secondary storage device 108 and to define thereon a plurality of secondary storage segments 130. Each secondary storage segment 130 is preferably of equal size, and is preferably equal in size to each of the primary storage segments 126. A secondary index 132 is assigned to each of the secondary storage segments 130, which is then saved as part of the SM 124a.

The SM 124a provides a map between the primary index 128 of each primary storage segment 126 containing data and the next available secondary storage segment 130 having a secondary index 132. The virtual mirror 124 is configured to perform this operation for all primary storage segments 126 forming the storage capacity of the primary storage device 106. In this case, the SM 124a can be used to provide a translation map (schematically illustrated in FIG. 4) between the primary and secondary storage devices 106, 108. This enables the data contained on the primary storage device 106 within one or more primary storage segments 116 to be saved to the secondary storage device 108 within secondary storage segments 120 having different secondary indices 132 to the respective primary storage segments 126.

Consequently, whilst the data corresponding to each primary storage segment 126 has duplicate copy on the secondary storage device 108, the data is not necessarily stored in the same order or in the same place on the secondary storage device 108 as on the primary storage device 106. Therefore, the secondary storage device 108 is not required to be identical to the primary storage device 106, effectively decoupling the two devices from one another. The secondary storage device 108 may, consequently, be smaller in capacity than the primary storage device 106, provided that the capacity of the secondary storage device 108 is sufficient to contain all the data stored on the primary storage device 106.

The operation of the electronic data store 100 will now be described with reference to FIGS. 5 to 8.

Figure 5:
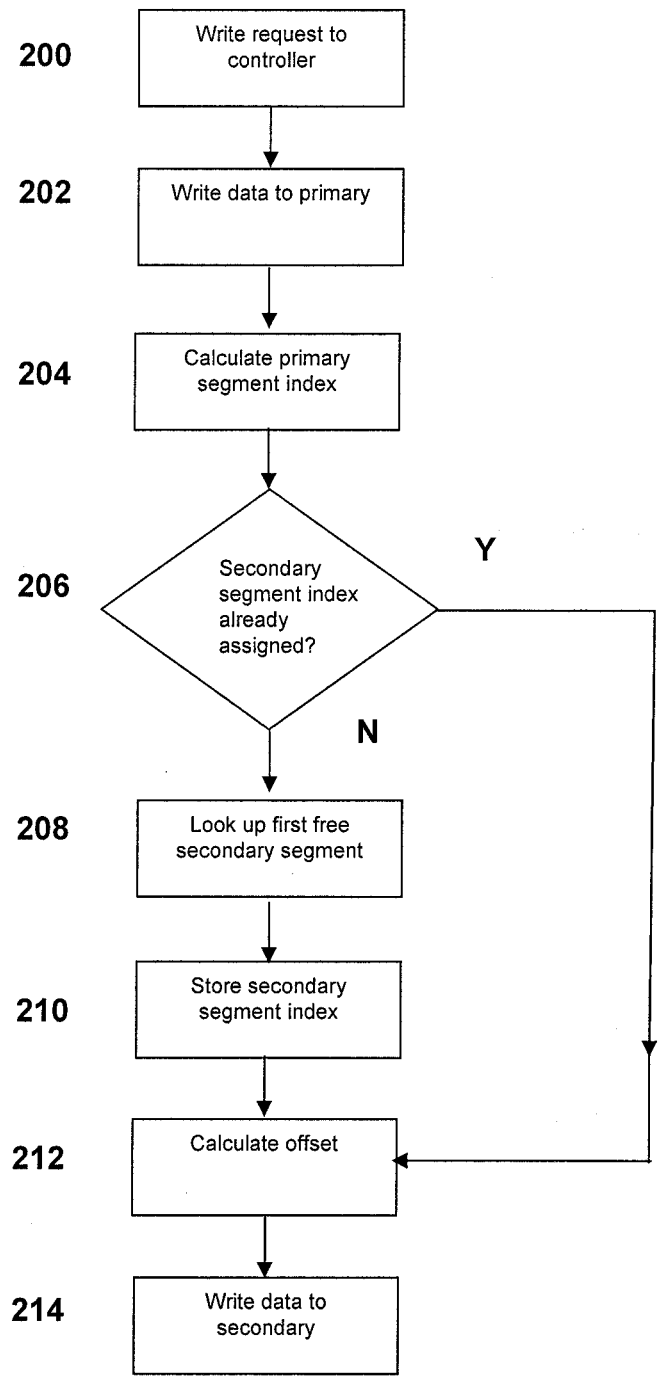
FIG. 5 is a flow diagram illustrating the process of writing data to a primary storage device and virtually mirroring that data on a secondary storage device.

FIG. 5 shows a flow diagram of the method for writing data to the primary storage device 106 and mirroring that data on the secondary storage device 108.

Step 200: Write Request to Controller

At step 200, the host 102 generates a write request for a specific volume (e.g. primary storage device 106) to which it has been assigned access rights. The request is sent via communication network 110 to the host ports (not shown) of the RAID controller 104. The write command is then stored in a local cache (not shown) forming part of the RAID controller hardware 120 of the RAID controller 104.

Step 202: Write Data to Primary Storage Device

The RAID controller 104 is programmed to respond to any commands that request write access to the primary storage device 106. The RAID controller 104 processes the write request from the host 102 and determines the region of the primary storage device 106 to which to write new data to. The data is then written to the primary storage device 106. The method then proceeds to step 204.

Step 204: Calculate Primary Segment Index

The RAID controller 104 then analyses the data saved to the primary storage device 106 and identifies the primary storage segment(s) 126 that the newly-written data has been written to. This may be done by, for example, determining the logical block address (LBA) to which the data is saved on the primary, and then determining therefrom the primary segment index 128. This may be done by, for example, calculating that four logical blocks comprise a single primary storage segment 126 and determining the primary index 128 therefrom. This information is then stored in the SM 124a. The method then proceeds to step 206.

Step 206: Secondary Segment Index Already Assigned?

At step 206, it is determined whether the secondary segment index 132 has already been assigned; for example, in a previous initialisation session or previous write request. If a secondary segment index 132 has been assigned, then the method proceeds to step 214. If a secondary segment index 132 has not been assigned, the method proceeds to step 208.

Step 208: Look Up First Free Secondary Segment

At step 208, the RAID controller 104 utilises a free-segment bitmap stored as part of the virtual mirror 124 to determine the first free secondary storage segment 130. The free-segment bitmap is updated each time a write occurs to a secondary storage segment 130. If a secondary storage segment 130 has not yet been written to, then the free-segment bitmap stores a 0 against that segment. However, if a write occurs to a particular secondary storage segment 130, then the 0 is changed to 1 and a 1 is stored against that segment in the free-segment bitmap. Consequently, the first free secondary storage segment 130 can be located by scanning the free-segment bitmap. The method then proceeds to step 210.

Alternatively, the free-segment bitmap may be scanned using a different criteria to find a free secondary storage segment 130. For example, bitmap could be scanned to find a free segment in a particular head sector or region of the secondary storage device 108.

In a further alternative, the free-segment bitmap could be omitted completely and the RAID controller 104 could proceed sequentially through the secondary storage segments 130 from the start of the secondary storage segments 130 of the secondary storage device 108 (i.e. starting from secondary index 0 or 1 and scanning in increments of secondary storage segments 130 or in increments of logical blocks) until a free segment is located.

Step 210: Store Secondary Segment Index in Segment Map

At step 210, when the first free secondary storage segment 130 is identified, the secondary index 132 associated with this secondary storage segment 130 is stored in the SM 124a against the corresponding primary index 128 assigned and stored in step 204. This provides a translational map between the primary and secondary storage devices 106, 108 to enable the secondary storage device 108 to function as a mirror for the primary storage device 106. The method then proceeds to step 212.

Step 212: Calculate Offset

At step 214, the byte offset from the start of the segment is calculated. This is in cases where a write request is not segment-aligned, i.e. the data is not aligned with the start of the storage segment in question. In many cases, more than one data packet will be stored within a particular storage segment. Alternatively, the data packet may be of such a size that it has to be split across two or more storage segments. The offset enables the start position of the data packet to be identified.

Step 214: Write Data to Secondary Storage Device

The data can now be written to the appropriate secondary storage segment on the secondary storage device 108. Since a map (the SM 124a) is provided which shows how the segment structure of the secondary storage device 108 translates to that of the primary, the RAID controller 104 is able to treat the data on the secondary storage device 108 as a mirror of the data on the primary storage device 106. This applies even though the actual location in which the data is stored on the secondary storage device 108 may be completely different from the location of data stored on the primary storage device 106. At this point, the free-segment bitmap (if provided) is updated to reflect that the segment has been written to.

Next, the process which occurs when a read is requested from either the primary storage device 106 or the secondary storage device 108 will be described. FIG. 6 shows a flow diagram of the process for reading data from the primary storage device 106.

Step 300: Read Request to Controller

At step 300, the host 102 generates a read request for the primary storage device 106 to which it has been assigned access rights. The request is sent via the communication network 110 to the host ports (not shown) of the RAID controller 104. The read command is then stored in a local cache (not shown) forming part of the RAID controller hardware 120 of the RAID controller 104.

Step 302: Read Data from Primary Storage Device

The RAID controller 104 is programmed to respond to any commands that request read access to the primary storage device 106. The RAID controller 104 processes the read request from the host 102 and determines the region of the primary storage device 106 in which the data is stored. The data is then read from the primary storage device 106 to be utilised by the host computer 102.

In addition to reading data from the primary storage device 106, data can also be read directly from the secondary storage device 108. This may occur in situations where, for example, the primary storage device 106 is experiencing a lot of accesses and the data can be retrieved more quickly from the secondary storage device 108. Ultimately, which device is accessed will be determined by the RAID controller 104.

FIG. 7 shows a flow diagram of the process for reading data from the secondary storage device 106.

Step 400: Read Request to Controller

At step 400, the host 102 generates a read request for the secondary storage device 106 to which it has been assigned access rights. The request is sent via the communication network 110 to the host ports (not shown) of the RAID controller 104. The read command is then stored in a local cache (not shown) forming part of the RAID controller hardware 120 of the RAID controller 104. The method then proceeds to step 402.

Step 402: Determine Primary Segment Index

At step 402, the RAID controller 104 analyses the data saved to the primary storage device 106 and calculates the primary segment index 128. The RAID controller 104 then identifies the primary segment index 128 of the primary storage segment(s) 126 that the read-requested data has been written to. The method then proceeds to step 404.

Step 404: Look Up Secondary Logical Block Address

The SM 124a is queried by the RAID controller 104 to determine the secondary index 132 (or secondary logical block address) which corresponds to the primary segment index 128 of the or each primary storage segment 126 identified at step 402 as being associated with the desired data to be read. The SM 124a provides a translational map between the primary and secondary storage devices 106, 108 to enable the required data on the secondary storage device 108 to be read. The method then proceeds to step 406.

Step 406: Calculate Offset

At step 406, the byte offset from the start of the identified secondary storage segment 130 is calculated. This enables the file system 118a to identify where the start of the data to be read is. The method then proceeds to step 408.

Step 408: Read Data from Secondary Storage Device

The RAID controller 104 now has, via the primary segment index 126, secondary segment index 132 and SM 124a, visibility of the secondary logical block address where the required data is stored on the secondary storage device 108. The RAID controller 104 can then access the required data on the secondary storage device 108 and the data can then be read by the host 102.

Under certain circumstances, the secondary storage device 108 may be required to be defragmented. Virtual mirror implementations of higher input/output processing efficiency may eventually result in a fragmented data arrangement on the secondary storage device 108. This will, of course, vary depending upon the data set stored thereon and the usage patterns on the primary storage device 106. Access involving a majority of data read commands is unlikely to cause fragmentation. However, random write/append command instructions will eventually result in fragmentation.

The secondary storage device 108 could be defragmented to "re-sync" the data alignment with that of the primary storage device 106 to present a more optimised alignment. When the secondary storage device 108 is defragmented, the resulting rearrangement of files and blocks is updated in the SM 124a and SBM 122 so that the virtual mirror can be maintained. Such defragmentation operations could be invoked by user request, scheduled maintenance or could be performed during Operating System idle time.

Another essential feature of a mirrored file system is that of a rebuild operation. If, for example, the primary storage device 106 should become corrupted or fail, or if the primary storage device 106 is to be upgraded to increase capacity or speed, then a rebuild operation will be required. In this case, the newly swapped-in primary storage device 106 can be rebuilt using the data stored on the secondary storage device 108 and by querying the SM 124a (comprising the primary segment indices 126 and corresponding secondary segment indices 132) to locate the data appropriately on the primary storage device 106. Likewise, if the secondary fails or needs to be upgraded to increase capacity, it would need to be rebuilt from the data on the primary as specified by the segment map 124a.

Additionally, the virtual mirror on the secondary storage device 108 need not mirror the whole of the primary storage device 106. For example, a part of the primary and secondary storage devices 106, 108 may be assigned as a standard RAID 1 mirror (as set out in FIG. 2), with the remainder of the primary storage device 106 being allocated a virtual mirror on the secondary storage device 108. This would create a two-tier policy of mirroring. There may be areas of the dataset on the primary storage device 106 for which mirroring can be optimally configured by using both conventional (RAID 1) mirroring and virtual mirroring.

In normal use, the virtual mirror implementation described above will be effectively invisible to the file system 118a, operating system 118 and host 102. This means that the host 102 will be presented with a view of the secondary storage device 108 which is preferably similar to that of a standard (RAID 1) mirror, with the operation of the virtual mirror being hidden to the host 102. However, there may be circumstances in which the virtual mirror file structure and interface could be exposed to the host 102.

One of these circumstances may arise when, in addition to storage mirroring of the primary storage device 106, the virtual mirror arrangement is implemented for backup purposes. In this case, an interface to the data store and management infrastructure could be exposed for backup purposes.

The interface to the virtual mirror configuration may be exposed through a proprietary Application Programming Interface (API) or through a conventional file system on the secondary storage device 108 (where the data store and affiliated management infrastructure is encapsulated inside one or more files). This approach may yield significant benefits in terms of backup performance when compared to conventional host-based file system approaches.

In a conventional, host-based file system, a significant portion of the time expended in backing up a storage device or logical volume is spent analysing the data. Commonly, every file is required to be touched or opened during the backup process. Even in cases where traditional image backup methods are used typically utilise a pre-analysis of the data or require the entire drive or volume to be processed (including unused free space on the drive or volume).

In contrast, in the virtual mirror approach, the data has been already analysed and packaged into file streams on the secondary storage device 108. Therefore, a backup operation could simply backup these file streams with speeds matching image backups, but without any additional processing overhead.

Further, a snapshot backup or split-mirror (with resync) backup could also be employed with the virtual mirror on the secondary storage device 108. In this situation, restoring the primary would simply require a restoration of the backup onto the secondary followed by a regeneration operation (i.e. a copy to the primary or a resync as described above). Alternatively, an on-the-fly regeneration performed directly from the backup system is yet another approach which could be used.

The virtual mirror implementation on the secondary storage device 108 also has the benefit that the data transfer could be effectively off-host during backup and restore operations, significantly improving archiving performance.

Whilst the previous embodiment of the present invention utilised the virtual mirror operating predominantly in off-host firmware or software (e.g. on the RAID controller 104), an on-host arrangement could be used. In this arrangement, the whole of the virtual mirroring operation is carried out in on-host software input/output subsystems. To illustrate such an arrangement, an alternative embodiment of the present invention is shown in FIG. 8.

Figure 8:
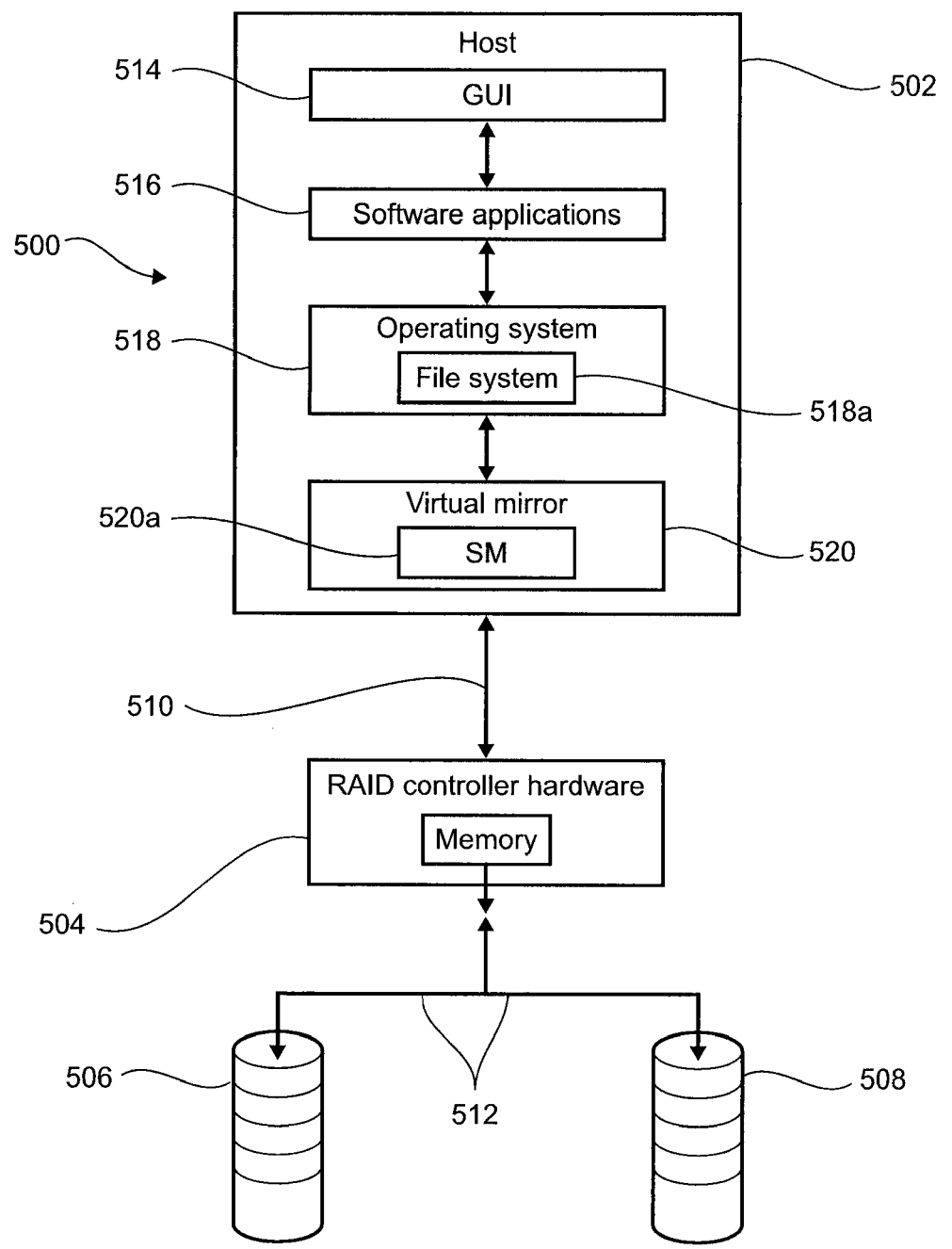
FIG. 8 is a schematic diagram illustrating an alternative embodiment of the present invention.

As shown in FIG. 8, a storage resource 500 comprises a host 502, a RAID controller 504, a primary storage device 506 and a secondary storage device 508. The host 502 is connected to the RAID controller 504 through a communication network 510 such as an Ethernet and the RAID controller 104 is, in turn, connected to the primary storage device 506 and the secondary storage device 508 via a storage network 512 such as an iSCSI network.

The host 502 comprises a general purpose computer (PC) which is operated by a user and which has access to the storage resource 500. A graphical user interface (GUI) 514 is run on the host 502. The GUI 514 is a software application which acts as a user interface for a user of the host 502.

In contrast to the embodiment of FIG. 3, in the embodiment of FIG. 8, the software application layer 516, operating system 518, file system 518a, virtual mirror 520 (including a segment map 520a) are implemented in software on the host computer 502 utilising, for example, the iSCSI protocol to communicate with the RAID controller 504.

The RAID controller 504 comprises hardware which is essentially similar to the RAID controller 104 of the embodiment of FIG. 3. The RAID controller 504 comprises a memory 522. However, there is no corresponding firmware or software for the software application layer 516, operating system 518 or data mirroring layer 520 on the primary and secondary storage devices 506, 508. This software, as described, is operated entirely on the host 502.

The primary storage device 506 comprises a hard disk drive generally of high capacity, for example, 1 TB. The primary storage device 506 can be accessed by the host 502 through the RAID controller 504 to read/write data. The secondary storage device 508 also comprises a hard disk drive generally of high capacity, for example, 500 GB to 1 TB. However, the secondary storage device 508 need not be identical to the primary storage device 506 and may be smaller in capacity.

The secondary storage device 508 can be accessed by the host 502 through the GUI 514 and RAID controller 504 to read/write data independently of the primary storage device 506. In this embodiment, the virtual mirror (VM) 520 including the SM 520a is implemented in software on the host 502 which provides the translation between the storage segments of the primary and secondary storage devices 506, 508.

Consequently, the host 502 controls the mapping and interface protocols which enable the secondary storage device 508 to contain a duplicate of the data stored on the primary storage device 506, albeit with different packaging of the data. This arrangement enables the requirements of the primary and secondary storage devices 506, 508 to be effectively decoupled without the need for a specialised RAID controller 504.

Variations of the above embodiments will be apparent to the skilled person. The precise configuration of hardware and software components may differ and still fall within the scope of the present invention.

For example, there need not be primary or secondary storage segments. Instead, the segment map may provide translation between primary data storage locations and secondary data storage locations in other manners; for example, logical block addresses, cylinder head sectors or a different file mapping arrangement.

If storage segments are provided, they need not be all the same size, neither need the primary storage segments be the same size as the secondary storage segments. Any arrangement which enables translation between the storage system of the primary device and the storage system of the secondary device may be used.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method of providing a virtual mirror of a primary storage device on a secondary storage device, said primary and secondary storage devices configured to be accessible for read/write operations through a file system, the method comprising:

providing a virtual mirror application arranged between the storage devices and the file system, the virtual mirror application comprising a map for translating primary data storage locations on said primary storage device to secondary data storage locations on said secondary storage device; and utilising said map to enable data stored on said secondary storage device to mirror data stored on said primary storage device such that said secondary storage device appears to the file system as an exact copy of the primary storage device.

2. A method according to claim 1, further comprising:

defining a plurality of primary storage segments on the primary storage device, each primary storage segment having a primary index;

defining a plurality of secondary storage segments on the secondary storage device, each secondary storage segment having a secondary index;

wherein the step of providing said map comprises storing, for at least one primary index of a primary storage segment, a corresponding secondary index of a secondary storage segment such that the or each secondary storage segment is mapped to a respective primary storage segment.

3. A method according to claim 2, further comprising:
writing data to at least one primary storage segment;
determining the primary segment index of the or each primary storage segment;
selecting one or more available secondary storage segments;
storing the secondary index of the or each selected secondary storage segment against the primary segment index of said the or each primary storage segment; and
writing a copy of said data to the or each corresponding secondary storage segment associated with the or each primary storage segment.

4. A method of providing a virtual mirror of a primary storage device on a secondary storage device, said primary and secondary storage devices configured to be accessible for read/write operations through a file system, the method utilising a virtual mirror application arranged between the storage devices and the file system such that said secondary storage device appears to the file system as an exact copy of the primary storage device, the method comprising:
defining, using the virtual mirror application, a plurality of primary storage segments on the primary storage device, each primary storage segment having a primary index;
writing data to at least one primary storage segment of the primary storage device;
determining, using the virtual mirror application, the primary segment index of the or each primary storage segment;
selecting, using the virtual mirror application, one or more available secondary storage segments on the secondary storage device;
storing, using the virtual mirror application, the secondary index of the or each selected secondary storage segment against the primary segment index of the or each primary storage segment to which the data has been written to; and
writing a copy of said data to the or each selected secondary storage segments.

5. A method according to claim 4, wherein the step of selecting further comprises selecting an available secondary storage segment from said secondary storage segments.

6. A method according to claim 5, wherein the step of selecting further comprises selecting the first available secondary storage segment sequentially from the start of said secondary storage segments.

7. A method according to claim 5 or, wherein the step of selecting further comprises identifying the available secondary storage segment from a bitmap file or memory location.

8. A method according to claim 4, further comprising, for the data to be written, calculating the byte offset from the start of the or each said secondary storage segment.

9. A method according to claim 2, further comprising reading data from a virtual mirror of said primary storage device on said secondary storage device, said step of reading data comprising:
determining the primary index of the primary storage segment corresponding to said data;
determining the secondary index of said of the secondary storage segment stored against said primary index; and
reading said data from the secondary storage segment having said secondary index.

10. A method of reading data from a virtual mirror of a primary storage device on a secondary storage device, said primary and secondary storage devices configured to be accessible for read/write operations through a file system, the method utilising a virtual mirror application arranged between the storage devices and the file system such that said secondary storage device appears to the file system as an exact copy of the primary storage device, the primary storage device having a plurality of primary storage segments defined thereon the virtual mirror application, each primary storage segment having a primary index, the secondary storage device having a plurality of secondary storage segments defined thereon by the virtual mirror application, each secondary storage segment having a secondary segment index, the method comprising:
determining, using the virtual mirror application, the primary index of the primary storage segment corresponding to said data;
determining, using the virtual mirror application, the secondary index stored against said primary index; and
reading said data from the secondary storage segment having said secondary index.

11. A method according to claim 10, further comprising, for the data to be read, calculating the byte offset from the start of the or each said secondary storage segment.

12. A method according to claim 2, wherein said primary storage segments are the same size.

13. A method according to claim 2, wherein said secondary storage segments are the same size.

14. A method according to claim 2, wherein said primary storage segments and said secondary storage segments are the same size.

15. A method according to claim 2, wherein said primary storage segments have a size equal to or greater than the size of a logical block on said primary storage device.

16. A method according to claim 2, wherein said secondary storage segments have a size equal to or greater than the size of a logical block on said secondary storage device.

17. A method according to claim 1, wherein said map comprises a look up table.

18. A method according to claim 17, wherein said primary and secondary storage devices are controlled by a controller, and said look up table is stored in a memory of said controller and/or in a non-volatile memory.

19. A method according to claim 17, wherein said primary and secondary storage devices are connected to a host computer, and said look up table is stored on said host computer.

20. A method according to claim 1, wherein the primary and secondary storage devices are of different size and/or configuration.

21. A controller for providing a virtual mirror of a primary storage device on a secondary storage device, said primary and secondary storage devices configured to be accessible for read/write operations through a file system, the controller being operable to:
provide a virtual mirror application arranged between the storage devices and the file system, the virtual mirror application comprising a map for translating primary data storage locations on said primary storage device to secondary data storage locations on said secondary storage device; and
utilise said map to enable data stored on said secondary storage device to mirror data stored on said primary storage device such that said secondary storage device appears to the file system as an exact copy of the primary storage device.

22. A controller according to claim 21, the controller being further operable to:
define a plurality of primary storage segments on a primary storage device, each primary storage segment having a primary index;
define a plurality of secondary storage segments on a secondary storage device, each secondary storage segment having a secondary index, wherein the controller is further operable to:
provide said map by storing, for at least one primary index of a primary storage segment, a corresponding secondary index of a secondary storage segment in order to map the or each secondary storage segment to a respective primary storage segment.

23. A controller according to claim 22, further operable to: write data to at least one primary storage segment, to determine the primary segment index of the or each primary storage segment, to select one or more available secondary storage segments, to store the secondary index of the or each selected secondary storage segment against the primary segment index of said the or each primary storage segment; and to write a copy of said data to the or each corresponding secondary storage segment associated with the or each primary storage segment.

24. A controller for providing a virtual mirror of a primary storage device on a secondary storage device, said primary and secondary storage devices configured to be accessible for read/write operations through a file system, the controller utilising a virtual mirror application arranged between the storage devices and the file system such that said secondary storage device appears to the file system as an exact copy of the primary storage device and being operable to: define, using the virtual mirror application, a plurality of primary storage segments on a primary storage device, each primary storage segment having a primary index, to write data to at least one primary storage segment of the primary storage device, to determine, using the virtual mirror application, the primary segment index of the or each primary storage segment, to select, using the virtual mirror application, one or more available secondary storage segments on the secondary storage device, to store, using the virtual mirror application, the secondary index of the or each selected secondary storage segment against the primary segment index of the or each primary storage segment to which the data has been written to; and to write a copy of said data to the or each selected secondary storage segments.

25. A controller according to claim 24, further operable to select an available secondary storage segment from said secondary storage segments.

26. A controller according to claim 25, further operable to select the first available secondary storage segment from the start of the sequence of said secondary storage segments.

27. A controller according to claim 26, further operable to identify the first available secondary storage segment from a bitmap file or memory location.

28. A controller according to claim 24, further operable, for the data to be written, to calculate the byte offset from the start of the or each said secondary storage segment.

29. A controller according to claim 21, further operable to read data from a virtual mirror of said primary storage device on said secondary storage device, the controller being operable to: determine the primary index of the primary storage segment corresponding to said data, to determine the secondary index of said of the secondary storage segment stored against said primary index; and to read said data from the secondary storage segment having said secondary index.

30. A controller for reading data from a virtual mirror of a primary storage device on a secondary storage device, said primary and secondary storage devices configured to be accessible for read/write operations through a file system, the controller utilising a virtual mirror application arranged between the storage devices and the file system such that said secondary storage device appears to the file system as an exact copy of the primary storage device, the primary storage device having a plurality of primary storage segments defined thereon by the virtual mirror application, each primary storage segment having a primary index, the secondary storage device having a plurality of secondary storage segments defined thereon by the virtual mirror application, each secondary storage segment having a secondary segment index, the controller being operable to: determine, using the virtual mirror application, the primary index of the primary storage segment corresponding to said data, to determine the secondary index stored against said primary index; and to read said data from the secondary storage segment having said secondary index.

31. A controller according to claim 30, further operable, for the data to be read, to calculate the byte offset from the start of the or each said secondary storage segment.

32. A controller according to claim 22, wherein said primary storage segments are the same size.

33. A controller according to claim 22, wherein said secondary storage segments are the same size.

34. A controller according to claim 22, wherein said primary storage segments and said secondary storage segments are the same size.

35. A controller according to claim 22, wherein said primary storage segments have a size equal to or greater than the size of a logical block on said primary storage device.

36. A controller according to claim 22, wherein said secondary storage segments have a size equal to or greater than the size of a logical block on said secondary storage device.

37. A controller according to claim 21, wherein said map comprises a look up table.

38. A controller according to claim 37, further comprising a memory and said look up table is stored in the memory and/or in a non-volatile memory.

39. A controller according to claim 38, wherein said primary and secondary storage devices are connected to a host computer, and said look up table is stored on said host computer.

40. A controller according to claim 21, wherein the controller is a RAID controller.

41. A controller according to claim 40, wherein the RAID controller is implemented in either hardware or software.

42. A controller according to claim 21, wherein the primary and secondary storage devices are of different size and/or configuration.

43. Data storage apparatus comprising a primary storage device, a secondary storage device and the controller of claim 21.

44. A non-transitory computer usable storage medium having a computer program product executable by a programmable processing apparatus, comprising one or more software portions for performing the steps of claim 1.

45. A method according to claim 3, wherein the step of selecting further comprises selecting an available secondary storage segment from said secondary storage segments.

46. A method according to claim 3, further comprising, for the data to be written, calculating the byte offset from the start of the or each said secondary storage segment.

47. A controller according to claim 23, further operable to select an available secondary storage segment from said secondary storage segments.

48. A controller according to claim 23, further operable, for the data to be written, to calculate the byte offset from the start of the or each said secondary storage segment.

49. A controller according to claim 29, further operable, for the data to be read, to calculate the byte offset from the start of the or each said secondary storage segment.

* * * * *